United States Patent
Li et al.

(10) Patent No.: US 10,841,093 B2
(45) Date of Patent: Nov. 17, 2020

(54) ACCESS MANAGEMENT TO INSTANCES ON THE CLOUD

(71) Applicant: EMC IP Holding Company LLC, Hopkinton, MA (US)

(72) Inventors: Hui Li, Chengdu (CN); Fangyuan Lin, Chengdu (CN); Rui Guo, Chengdu (CN); Ou Zhang, Chengdu (CN); Xiaohui Wang, Chengdu (CN); Min Han, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 167 days.

(21) Appl. No.: 16/119,992

(22) Filed: Aug. 31, 2018

(65) Prior Publication Data

US 2020/0044847 A1    Feb. 6, 2020

(30) Foreign Application Priority Data

Aug. 3, 2018   (CN) .......................... 2018 1 0879335

(51) Int. Cl.
    *H04L 9/30*     (2006.01)
    *H04L 9/14*     (2006.01)
    *H04L 9/32*     (2006.01)
    *H04L 9/08*     (2006.01)
    *H04L 29/06*    (2006.01)

(52) U.S. Cl.
    CPC .......... *H04L 9/3073* (2013.01); *H04L 9/0861* (2013.01); *H04L 9/14* (2013.01); *H04L 9/3228* (2013.01); *H04L 63/108* (2013.01)

(58) Field of Classification Search
    CPC ... H04L 9/3073; H04L 63/108; H04L 9/0861; H04L 9/3228; H04L 9/14; H04L 9/0894; H04L 9/0825; H04L 9/088; H04L 63/10; H04L 63/083; H04L 63/0823; H04L 9/0863; H04L 9/3263
    See application file for complete search history.

(56) References Cited

U.S. PATENT DOCUMENTS

| | | | |
|---|---|---|---|
| 6,769,068 B1 * | 7/2004 | Brozowski | H04L 63/08 726/1 |
| 2006/0094403 A1 * | 5/2006 | Norefors | H04W 12/0608 455/411 |
| 2007/0248231 A1 * | 10/2007 | Kasahara | G06F 12/1416 380/277 |
| 2008/0063191 A1 * | 3/2008 | Hatano | G06F 21/6209 380/45 |

(Continued)

*Primary Examiner* — Cheng-Feng Huang
(74) *Attorney, Agent, or Firm* — Womble Bond Dickinson (US) LLP

(57) ABSTRACT

Managing access to instances on a public cloud can include in responding to a request from a user to create a support account for a target instance on a public network. A process can include generating a key pair including a public key and a private key, creating, in the target instance, a support account, and associating the public key with the target instance. Access to the private key can be provided to facilitate a connection to the target instance through the support account. Temporary credentials can be generated and associated with the target instance. Upon expiration of the temporary credentials, the support account can be disabled by removing the support account from the target instance and disassociating the public key with the target instance.

16 Claims, 4 Drawing Sheets

(56) References Cited

U.S. PATENT DOCUMENTS

| | | | |
|---|---|---|---|
| 2010/0332845 A1* | 12/2010 | Asaka | H04L 9/0838 |
| | | | 713/189 |
| 2015/0229475 A1* | 8/2015 | Benoit | G06F 21/41 |
| | | | 713/168 |
| 2015/0312356 A1* | 10/2015 | Roth | G06F 11/25 |
| | | | 709/226 |
| 2018/0123804 A1* | 5/2018 | Smith | H04L 9/3263 |
| 2019/0245856 A1* | 8/2019 | Irwan | H04L 63/105 |
| 2019/0286813 A1* | 9/2019 | Lounsberry | H04L 9/3268 |
| 2019/0288995 A1* | 9/2019 | Bose | H04L 63/0807 |

\* cited by examiner

ACCESS MANAGEMENT TO INSTANCES ON THE CLOUD

RELATED APPLICATIONS

This application claims priority, under 35 U.S.C. Section 119, of China Patent Application 201810879335.3 filed on Aug. 3, 2018 and entitled "ACCESS MANAGEMENT TO INSTANCES ON THE CLOUD."

TECHNICAL FIELD

Embodiments of the present invention relate generally to cloud instances. More particularly, embodiments of the invention relate to managing access to instances on the public cloud.

BACKGROUND

A cloud service can provide computing capacity over a network. Cloud computing generally includes virtual computing environments, known as instances. Instances can come in the form of a virtual machine or virtual server, each capable of having an operating system and additional applications.

A variety of instance types exist, some optimized to fit specific use cases, while some instance types are developed for general purpose. Instance types can have varying combinations of memory, CPU, and networking capabilities.

Organizations are increasingly deploying applications on virtual machines (VMs) to improve Information Technology (IT) efficiency and application availability. A key benefit of adopting virtual machines is that they can be hosted on a smaller number of physical servers (VM servers).

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
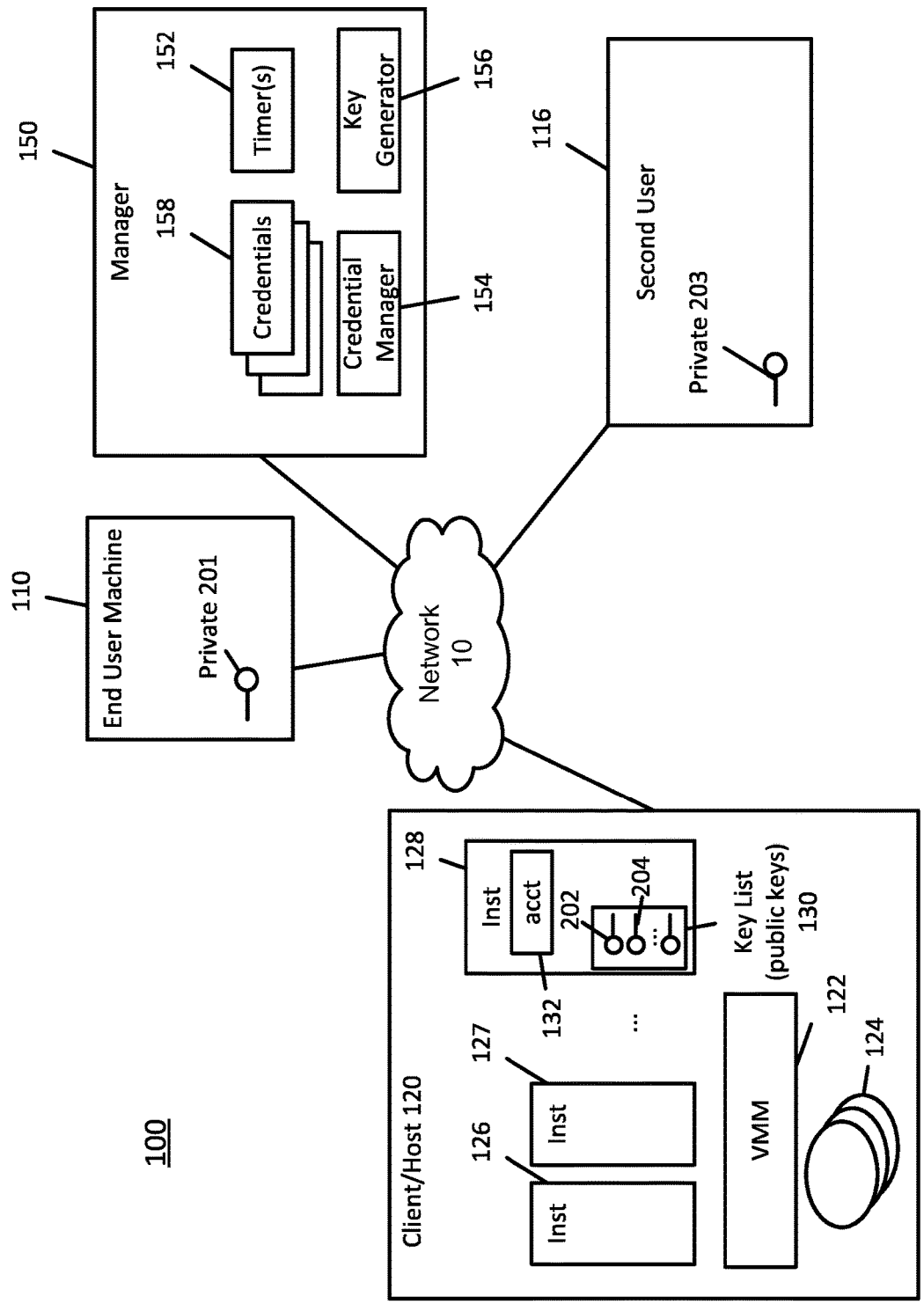
FIG. 1 is a block diagram illustrating instances on a public cloud according to one embodiment.

A public cloud can be described as computing services offered by third-party providers over the public Internet. These services can include virtual machines (VMs), applications or storage. The services can be provided in the form of virtual computing environments, or instances.

Key based authentication can be used to improve security on the public cloud. For example, connection to instances (e.g., logging in to an instance) can be performed through a key pair, including a public key and a private key. A public key can be stored by a manager, or on the instance (for example, in a key list). A private key can be stored by a user, to be kept in a secure place, not accessible to the public. Because the private key is required to access the instance, this allows for the management of multiple instances securely, because only users need a private key to access instances having a corresponding public key. The private key, therefore, is critical to security on the public cloud and should not be shared by the user with others.

Problems can occur in an instance, however, that may require professional services or tech support. For example, if an application on the instance stalls or is behaving questionably, a user may request the help of tech support. In some cases, maintenance may be required to be performed on an instance. Thus, there are situations where a user may want another user (for example, tech support) to log into the instance. One solution for this that does not require key sharing is remote controlling, where the tech support remotes into (and controls) the user's computer, where the user is logged into the instance. In this manner, the tech support or service professional can access the instance. Unfortunately, remoting is not always practical, convenient, or possible. For example, scheduling conflicts or operating system conflicts may prevent the ability for remoting.

In the case of key sharing, obvious security risks can arise. For example, tech support may breach the user's trust and perform unauthorized acts with the instance. Furthermore, key sharing may present liability issues on the side of the techsupport, who may be wrongly accused for future security breaches, once the private key has been shared with the technical support.

In one aspect, a system and method resolves the problems described herein through managing and restricting temporary access to instances on the public cloud. A method performed by a computing device can include: in response to a request from a user to create a support account for a target instance on a public network: generating a key pair including a public key and a private key; creating, in the target instance, a support account; associating the public key with the target instance; providing access to the private key, wherein the key pair can facilitate a connection to the target instance through the support account; and generating temporary credentials associated with the target instance. Upon expiration of the temporary credentials, the system and method can include removing the support account from the target instance and disassociating the public key with the target instance, resulting in termination of current connections and barring future connections to the target instance through the key pair.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, a public cloud system 100 is shown in FIG. 1. A manager 150 can connect to a network 10, where the network is the public internet. Also connected to the network is an end user machine 110 operated by a user, a client/host 120, and admin(s) 116. The client/host 120 can include a virtual machine manager 122 (e.g., a hypervisor)

that creates and manages resources (for example, computational resources and disk storage 124) for a plurality of instances, including 126 127 and 128.

A user, through the user machine 110 can request the manager 150 to create a support account relating to a target instance 128 and grant permissions for the support account. Although a single host 120 is shown, the manager 150 can communicate with multiple hosts over the network 10, and manage access to instances along the multiple hosts, as described herein. The manager 150 can include timers 152, a credential manager 154 configured to generate, monitor, and remove/destroy credentials 158, and a key generator 156, as well as other typical computer features such as memory, one or more CPUs, network devices, and other software and hardware known in the art.

The key generator 156 can generate temporary key pairs. An example is shown in FIG. 1, where a key pair including a private key 201 and a public key 202 is generated. The public key is associated with instance 128. The private key 201 is held by the end user machine, and the corresponding public key 202 is associated with instance 128, for example, stored in a key list 130. Key pairs can be based on known cryptographic algorithms.

Public key 204 of the second key pair can be similarly associated with the target instance 128, and corresponding private key 203 can be held by a second user 116, which can be a machine used by a second user such as an administrator or tech support. The each key pair can be associated with an account in a particular instance. For example, the key pair 203 and 204 can be associated with a support account. Thus, access and permissions of the holder of the private key 203 can be limited to access and permission rights associated with the support account.

The credential manager 154 can generate credentials relating to the request from the user and the corresponding support account. The credentials can include an identification of a target instance, a key pair, a credential expiration time, and permissions associated with the support account, or combinations thereof.

The credentials can have an expiration time can be implemented through one or more timers 152. The timers can trigger actionable events upon an expiration, elapse of a time, or periodic elapses. Actions can include, for example, removing a support account and public key from an instance. It should be understood, however, that a timer, in this case, can take the form of a simple counter that increments or decrements and, upon counting to a predetermined number, is considered by the manager to have elapsed.

Thus, the credentials can link key pairs to target instances and support accounts, and contain information (for example, an expiration time) that allows the manager 150 to manage access to instances, as described in greater detail below.

Figure 2:
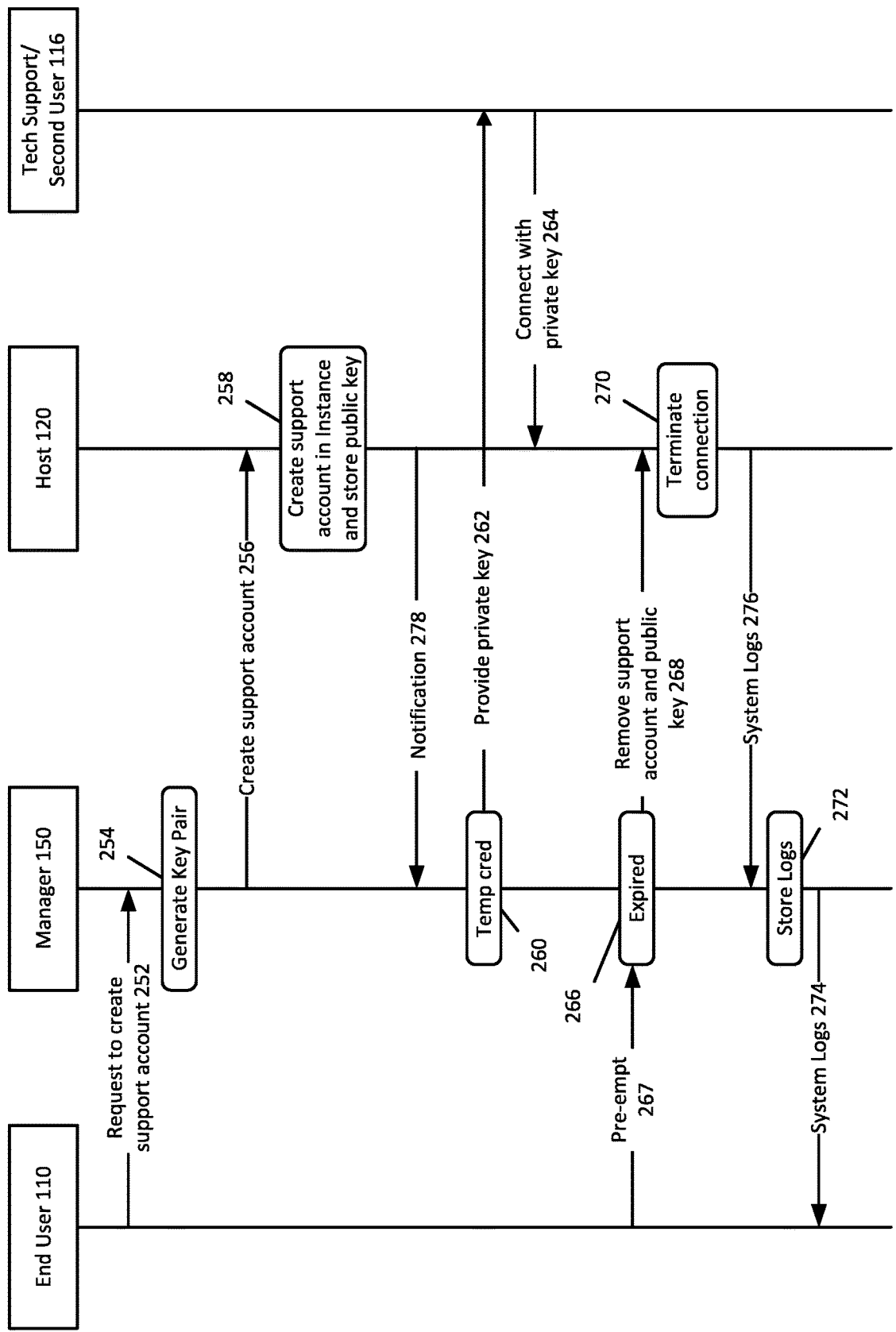
FIG. 2 is a sequence diagram showing access management of instances according to one embodiment.

As shown in FIG. 2, in one embodiment, an end user 110 sends a request via path 252 to create a support account in connection with a target instance to the manager 150. The request can include permissions to be associated with the support account and/or an expiration time that determines the lifespan of the support account.

The manager 150 generates a key pair via path 254 and sends a request via path 256 to the host 120 to create a support account associated with the target instance at block 258. The request to the host can include the permissions to be associated with the support account, based on the permissions from the user request. The request to the host 256 can include the public key generated in 254. The host 120 can create 258 a support account with the target instance, and associate the public key with the target instance, for example, by storing the public key in an authorized key list associated with the target instance.

The manager 150 can receive a notification 278 from the host, confirming that the support account has been created. Alternatively, the manager can simply assume that the support account has been created successfully unless indicated otherwise (for example, through an error message).

The manager 150 can generate at block 260 temporary credentials relating to the support account and the target instance and provide via path 262 a private key of the key pair to a second user (for example, tech support). The private key can be provided for example, as a downloadable key from the public network, or it can be send to a user through email, ftp, or other known delivery methods. A method of providing the private key and/or the recipient of the private key can be specified by the user request 152 and/or it can be a memory setting in the manager 150. The temporary credentials can have an expiration time based on an expiration time specified in the user request 252. Alternatively, the expiration time can be a setting in memory, accessible to the manager 150. Alternatively or additionally, the expiration time of the credentials can be based on a type of the instance or applications associated with the target instance. The determination can be made, for example, based on a look up table or similar technique that selects an expiration time based on the type of target instance, applications associated with the target instance, or other parameters relating to the target instance.

The second user 116 can connect 264 to the target instance by logging into the support account of the instance with the private key. The second user can be a tech support professional logging into the support account to perform support actions such as installing software, troubleshooting, or performing diagnostics and maintenance. The second user's actions can be limited based on the permissions and/or restrictions associated with the support account.

Upon expiration of the temporary credentials 266, the manager can send a request 268 to remove/destroy the support account and disable the public key. The host 120 can remove or destroy the support account and disassociate the public key from the instance (for example, by removing the public key from authorized key list). When this happens, the all connections based on the public key and the support account will be terminated. Another way to describe this is that the underlying communication protocol (for example, secure socket shell protocol) will terminate the connection between to the instance and the holder of the private key (in this example, second user 116) associated with the removed public key.

Beneficially, this provides access to instances with a separate set of permissions, capable of being terminated by the manager, without requiring the original user to share her original private key.

In one embodiment, generating the temporary credentials includes setting a timer and the expiration of the temporary credentials is triggered by an expiration of the timer.

Alternatively or additionally, the expiration of the temporary credentials can be forced by a pre-emptive request 267 to discontinue or end the support account. Such a request can be initiated by an end user 110 or a different user (for example, one with administrative privileges) and received by the manager.

Alternatively or additionally, the manager may trigger the expiration of the temporary credentials based on monitored actions of the instance. For example, if the manager detects that the behavior of the instance under the support account violates predetermined rules, the logic processing unit of the manager may pre-emptively remove the support account to prevent further violation of the rules.

In one embodiment, the manager can receive a system log 276 relating to the support account. For example, the system log can contain actions performed by the support account. The manager can store this log in memory 272 and/or provide access 274 to the system logs, for example, to the original user or to administrators. In this manner, the user/owner of the instance as well as administrators can audit the operations and behavior of users of the support account, for example, technical support.

Figure 3:
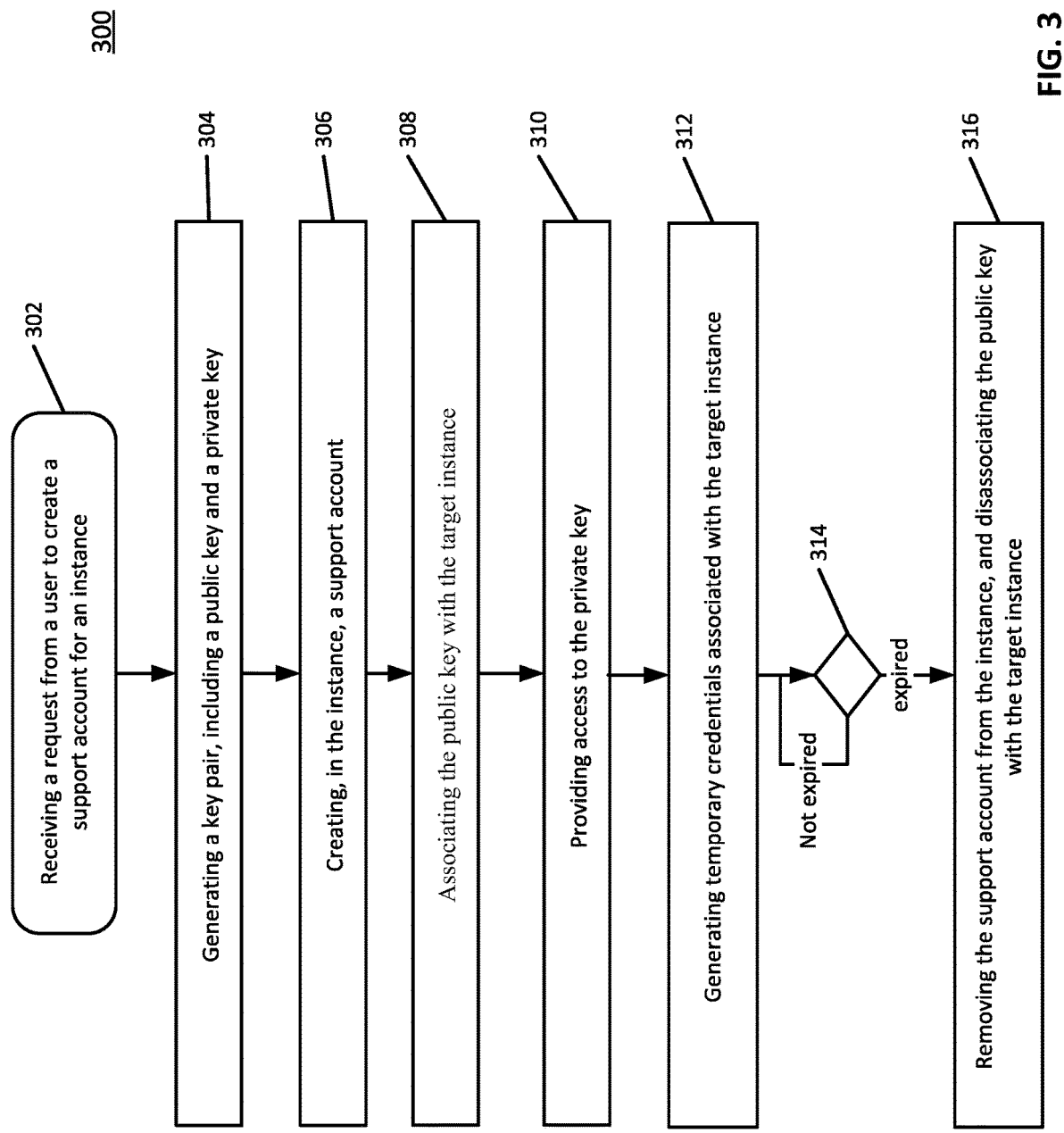
FIG. 3 is a flow diagram illustrating a method for access management of instances according to one embodiment.

FIG. 3 is a flow diagram illustrating a process of managing access to instances on the public cloud is shown. Process 300 may be performed by processing logic which may include software, hardware, or a combination thereof. For example, process 300 may be performed by manager 150. Referring to FIG. 3, at block 302, processing logic receives a request from a user to create a support account for a target instance on a public network.

In response to such a request, at block 304, processing logic generates a key pair including a public key and a private key. At block 306, in the instance, a support account is created. At block 308, the processing logic associates the public key with the target instance. At block 310, processing logic provides access to the private key, wherein the private key can provide a connection to the target instance through the support account. At block 312 processing logic generates temporary credentials associated with the target instance. Processing logic monitors the expiration of the temporary credentials at block 314. Monitoring, in this case can be active (e.g., through polling) and/or passive (e.g., event driven).

Upon expiration of the temporary credentials, at block 316 the processing logic removes the support account from the instance and disassociating the public key from the target instance. This can be done, for example, by removing the public key from the authorized key list associated with the target instance. Connections to the target instance are terminated, as a result.

It is to be understood that, although generally described as managing access to a target instance, the system and methods described herein are repeated in response to a plurality of requests from a plurality of users to manage access to a plurality of instances over a plurality of hosts.

Figure 4:
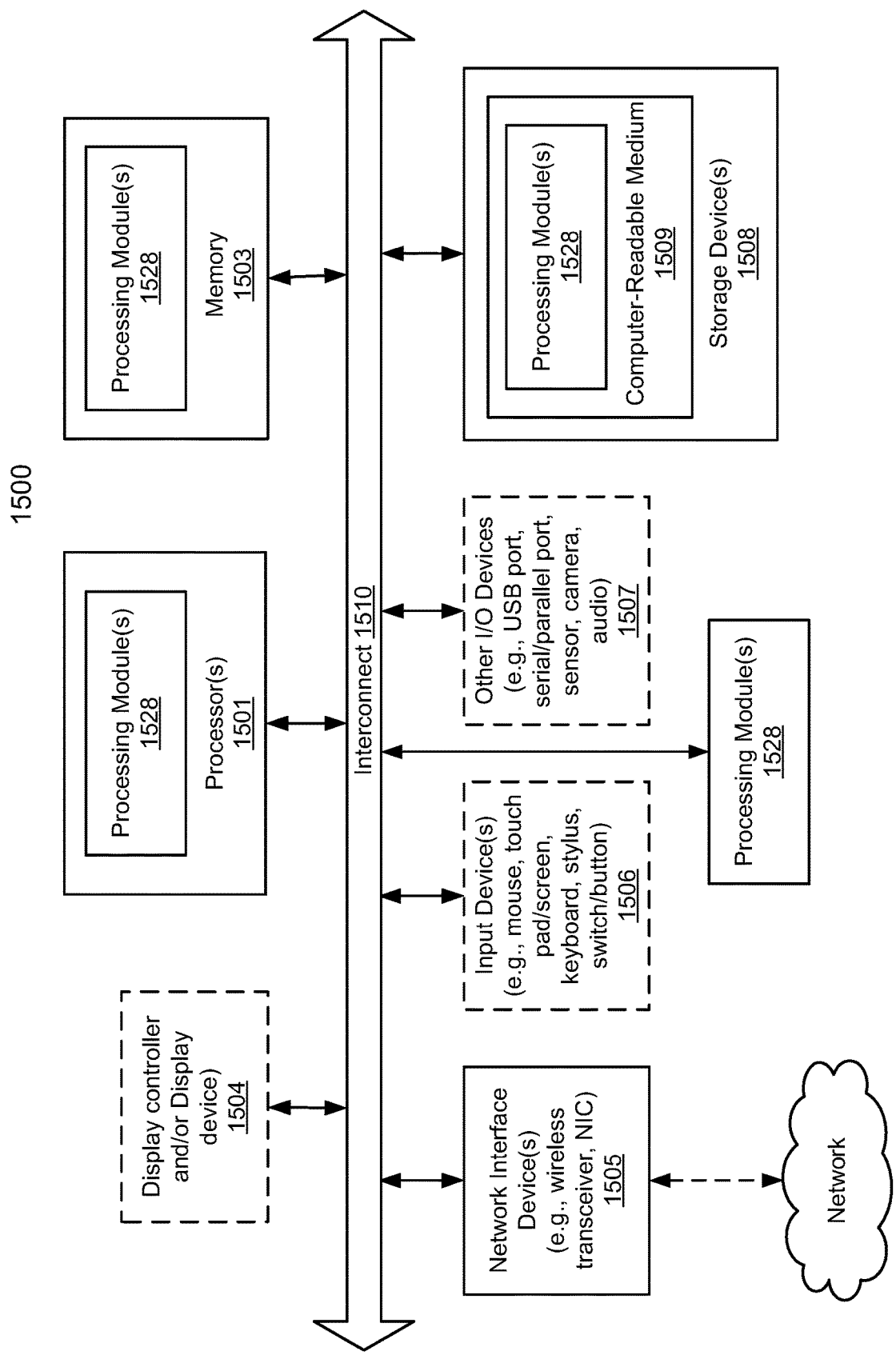
FIG. 4 is a block diagram illustrating a data processing system according to one embodiment.

FIG. 4 is a block diagram illustrating an example of a data processing system which may be used with one embodiment of the invention. For example, system 1500 may represents any of data processing systems such as host 120, user machines 110 and 116, and manager 150. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, snapshot generation module 203, snapshot analyze module 205, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a computing device comprising:
    in response to a request from a user to create a support account for a target instance on a public network:
        generating a key pair including a public key and a private key;
        creating, in the target instance, the support account;
        associating the public key with the target instance, including storing the public key in an authorized key list associated with the target instance;
        providing access to the private key, wherein the key pair can facilitate a connection to the target instance through the support account;
        generating temporary credentials associated with the target instance, wherein the request from the user includes permissions associated with the support account and an expiration time of the temporary credentials; and
    upon expiration of the temporary credentials, removing the support account from the target instance and disassociating the public key with the target instance, resulting in termination of current connections and barring future connections to the target instance through the key pair.

2. The method according to claim 1, wherein generating the temporary credentials includes setting a timer and the expiration of the temporary credentials is triggered by an expiration of the timer.

3. The method according to claim 1, wherein the expiration of the temporary credentials is forced as a response to a user pre-emption request to discontinue the support account.

4. The method according to claim 1, wherein:
    disassociating the public key with the target instance includes removing the public key from the authorized key list.

5. The method according to claim 1, further comprising retrieving, from the instance, a system log, the system log containing actions performed on the instance through the support account.

6. The method according to claim 1, wherein the connection to the target instance is through a network using a secure socket shell (SSH) protocol.

7. The method according to claim 1, wherein the key pair is based on a cryptographic algorithm.

8. The method according to claim 1, further comprising repeating each process to manage access to a plurality of target instances.

9. A non-transitory machine-readable medium having instructions stored therein, which when executed by a processor, cause the processor to perform operations, the operations comprising:
    in response to a request from a user to create a support account for a target instance on a public network:
        generating a key pair including a public key and a private key;
        creating, in the target instance, the support account;
        associating the public key with the target instance, including storing the public key in an authorized key list associated with the target instance;
        providing access to the private key, wherein the key pair can facilitate a connection to the target instance through the support account;
        generating temporary credentials associated with the target instance, wherein the request from the user includes permissions associated with the support account and an expiration time of the temporary credentials; and
    upon expiration of the temporary credentials, removing the support account from the target instance and disassociating the public key with the target instance, resulting in termination of current connections and barring future connections to the target instance through the key pair.

10. The non-transitory machine-readable medium according to claim 9, wherein generating the temporary credentials includes setting a timer and the expiration of the temporary credentials is triggered by an expiration of the timer.

11. The non-transitory machine-readable medium according to claim 9, wherein the expiration of the temporary credentials is forced as a response to a user pre-emption request to discontinue the support account.

12. The non-transitory machine-readable medium according to claim 9, wherein:
    disassociating the public key with the target instance includes removing the public key from the authorized key list.

13. The non-transitory machine-readable medium according to claim 9, wherein the operations further comprise:
    retrieving, from the instance, a system log, the system log containing actions performed on the instance through the support account.

14. The non-transitory machine-readable medium according to claim 9, wherein the connection to the target instance is through a network using a secure socket shell (SSH) protocol.

15. The non-transitory machine-readable medium according to claim 9, wherein the key pair is based on a cryptographic algorithm.

16. A system comprising:
    a processing system having at least one hardware processor, the processing system coupled to a memory programmed with executable instructions that, when executed by the processing system, perform operations comprising:

in response to a request from a user to create a support account for a target instance on a public network:
- generating a key pair including a public key and a private key;
- creating, in the target instance, the support account;
- associating the public key with the target instance, including storing the public key in an authorized key list associated with the target instance;
- providing access to the private key to an administrator or technical support user, wherein the key pair can facilitate a connection to the target instance through the support account;
- generating temporary credentials associated with the target instance, wherein the request from the user includes permissions associated with the support account and an expiration time of the temporary credentials; and upon expiration of the temporary credentials, removing the support account from the target instance and disassociating the public key with the target instance, resulting in termination of current connections and barring future connections to the target instance through the key pair.

* * * * *